United States Patent

Benkler

(12)

(10) Patent No.: US 6,616,219 B2
(45) Date of Patent: Sep. 9, 2003

(54) ENERGY ABSORBING DEFORMATION ELEMENT

(75) Inventor: Olaf Benkler, Neuhausen/Hamberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/020,935

(22) Filed: Dec. 19, 2001

(65) Prior Publication Data

US 2002/0074828 A1 Jun. 20, 2002

(30) Foreign Application Priority Data

Dec. 19, 2000 (DE) .......................................... 100 63 339

(51) Int. Cl.⁷ ................................................ B60J 7/00
(52) U.S. Cl. ...................................... 296/189; 296/188
(58) Field of Search ................. 296/189, 39.1, 296/30, 146.7, 188; 280/751, 730.2, 801.2; 430/138; 293/120

(56) References Cited

U.S. PATENT DOCUMENTS

| | | | | |
|---|---|---|---|---|
| 4,890,877 A | * | 1/1990 | Ashtiani-Zarandi et al. ............. | 296/146.7 |
| 5,507,540 A | * | 4/1996 | Pernot ......................... | 293/120 |
| 5,660,426 A | * | 8/1997 | Sugimori et al. ............ | 296/189 |
| 5,700,028 A | * | 12/1997 | Logan et al. ............. | 280/730.2 |
| 5,709,407 A | * | 1/1998 | Stephens et al. ............ | 296/189 |
| 5,762,392 A | * | 6/1998 | Suga ........................... | 296/189 |
| 5,779,271 A | * | 7/1998 | Dorow et al. ................ | 296/189 |
| 5,795,013 A | * | 8/1998 | Keller et al. ................. | 296/188 |
| 5,938,273 A | * | 8/1999 | Williams et al. ............. | 296/189 |
| 5,992,914 A | * | 11/1999 | Gotoh et al. ................. | 296/189 |
| 5,992,924 A | * | 11/1999 | Noritake et al. ............. | 296/189 |
| 6,049,952 A | * | 4/2000 | Mihelich et al. ............ | 296/189 |
| 6,059,342 A | * | 5/2000 | Kawai et al. ................ | 296/189 |
| 6,068,320 A | * | 5/2000 | Miyano ....................... | 296/189 |
| 6,079,732 A | * | 6/2000 | Nakajima et al. ......... | 280/730.2 |
| 6,082,792 A | * | 7/2000 | Evans et al. ................ | 296/189 |
| 6,126,231 A | * | 10/2000 | Suzuki et al. ............... | 296/189 |
| 6,145,908 A | * | 11/2000 | Deb et al. .................... | 296/189 |
| 6,199,907 B1 | * | 3/2001 | Mugford et al. ............ | 280/751 |
| 6,346,359 B1 | * | 2/2002 | Yamada et al. ............. | 430/138 |
| 6,357,812 B1 | * | 3/2002 | Adachi et al. .............. | 296/189 |
| 6,390,538 B1 | * | 5/2002 | Hashimoto et al. ......... | 296/189 |
| 6,454,305 B1 | * | 9/2002 | Prottengeier ............. | 280/801.2 |
| 6,460,890 B2 | * | 10/2002 | Dietrich .................... | 280/801.2 |
| 2002/0096912 A1 | * | 7/2002 | Page .......................... | 296/189 |
| 2002/0135206 A1 | * | 9/2002 | Lemmon et al. ........... | 296/189 |

FOREIGN PATENT DOCUMENTS

DE          19505935          8/1995

* cited by examiner

*Primary Examiner*—Kiran Patel
(74) *Attorney, Agent, or Firm*—Crowell & Moring LLP (57) ABSTRACT

A deformation element is arranged in vehicle pillars and/or between an inside roof lining and a transverse roof support and comprises U-beam shaped elements connected through connecting ribs to form a unit. Reinforcement ribs are provided within the U-shaped beams of the deformation element.

54 Claims, 7 Drawing Sheets

ENERGY ABSORBING DEFORMATION ELEMENT

BACKGROUND AND SUMMARY OF THE INVENTION

This application claims the priority of German Patent Document 100 63 339.0, filed Dec. 19, 2000, the disclosure of which is expressly incorporated by reference herein.

The invention relates to an energy-absorbing deformation element for use in pillars, supports and similar components for motor vehicles arranged in a body structure between a panel element and an interior material.

In German Patent Document DE 195 05 935 A1, a structure of absorbing impact energy is known, which consists of a latticed element that comprises continuous longitudinal ribs, between which lateral ribs are arranged. The lateral ribs and the longitudinal ribs are inclined to the panel and the interior material.

An aspect of the invention is in creating an energy-absorbing deformation element in pillars, supports and similar components in a body structure for motor vehicles. This element is easy to manufacture, can be adjusted optimally to the characteristics in the supports, pillars and an inside roof lining and can be connected with these vehicle components. Defined energy absorption is guaranteed particularly in the case of a head impact.

This aspect is resolved, according to certain embodiments of the invention, with a latticed element, wherein the deformation element comprises U-beams arranged at a distance to each other, each of the U-beams having a transverse rib and reinforcement ribs arranged transversely between legs of the U-beams, and wherein the beams are connected via connecting ribs to an elongated component that is arranged at least in one plane. Further beneficial features are included in the preferred embodiments.

The major advantages achieved with certain preferred embodiments of the invention are that the deformation element comprises an easily manufactured latticed structure from U-beams, which are joined together and can be adjusted accordingly to the requirements in their dimensions. The individual beams are connected with each other only through connecting ribs to form an oblong element. The deformation elements can also be fastened easily to the vehicle pillars and/or the vehicle structure or a rigid inside roof lining via the rib or ribs of the U-beam.

The deformation element preferably comprises U-beams, which are arranged at a distance from each other, with a rib and reinforcement ribs arranged transversely between the legs of the beams. The beams are connected by at least one connecting rib with an extended component arranged in at least one plane, with this component taking on any random configuration. The deformation elements preferably are made of polymer.

When using the deformation element in a vehicle pillar, the ribs of the beams preferably face the interior wall of the vehicle pillar and the ribs of the interior material and/or the pillar material. By contrast, the ribs of the U-beam of the deformation element are connected with the inside roof lining and face the legs of the panel.

Energy absorption is defined in both cases in such a way that the necessary requirements for energy absorption are fulfilled upon head impact.

The legs of the beams can have differing heights in the longitudinal direction of the beam. The heights of the legs also can have a design that follows the shape of the panel element, and the outer surface of the beam ribs contain a continuously perforated surface. This ensures in a beneficial way an optimal adjustment of the deformation element to the vehicle structure, i.e. to the vehicle pillar and/or the roof.

In order to reinforce the U-beams, they are connected with each other through reinforcement ribs, wherein in the beam at least one reinforcement rib is provided between the legs, while this rib can also be arranged on the end of the beam. The ribs as well as the U-beams have a low wall thickness so that bending is possible.

In the assembled state, the U-beams are beneficially arranged transversely to the vehicle pillar on top of each other roughly in one plane and form two branches arranged at a distance from each other in the shape of a U and are connected with each other at their upper ends by a continuous beam element. This way a deformation element is created, which can be adjusted to a support structure, such as a vehicle pillar, i.e. the actual U-beams of the deformation element are located opposite surfaces of the pillar beam, wherein a hollow space of the pillar beam is free from the deformation elements.

The deformation element can be used on vertically arranged pillars of the vehicle structure and/or in the area of the roof lining and/or a transverse roof beam.

In the arrangement on a vehicle pillar, the deformation element is connected through at least one rib, which faces the interior surface of the pillar, wherein the interior material of the pillar is located opposite the legs of the beam. When using the deformation element on the vehicle roof, it is connected with the rigid inside roof lining, wherein a center section of the deformation element then extends crosswise to the vehicle. Another part of the deformation element extends in the longitudinal direction of the vehicle.

The deformation element that is arranged on the pillar contains on the upper free end an oblong, one-piece U-shaped beam as a deformation element, which simultaneously is designed as a ramp part with a tapered surface for a head airbag. The ramp surface beneficially serves the purpose of guiding the head airbag in the appropriate direction toward the head of a passenger in the case of a crash.

Other objects, advantages and novel features of the present invention will become apparent from the following detailed description of the invention when considered in conjunction with the accompanying drawings.

DETAILED DESCRIPTION OF THE DRAWINGS

In the vehicle, the so-called deformation elements 1, 1a are arranged in the form of latticed elements between a panel element and an interior material 13 in areas of the vehicle structure adjacent to the head of a vehicle passenger, such as on the vehicle pillars, in supports and/or similar components, for the purpose of energy absorption during a head impact.

The deformation element 1, 1a comprises a plurality of U-beams 2 and/or U-beam-shaped elements with a transverse rib 3 and legs S1, S2 that limit the rib. The beams 2 are connected with each other through longitudinal connecting ribs 4 and/or 5 to form an elongated component. Between the legs S1, S2 of the beams 2, one or several reinforcement ribs 6, 6a can be arranged. These reinforcement ribs 6, 6a are provided either at the end of the beam 2 as reinforcement ribs 6a or as reinforcement ribs 6 in an area between the two legs of the beam 2.

Figure 1:
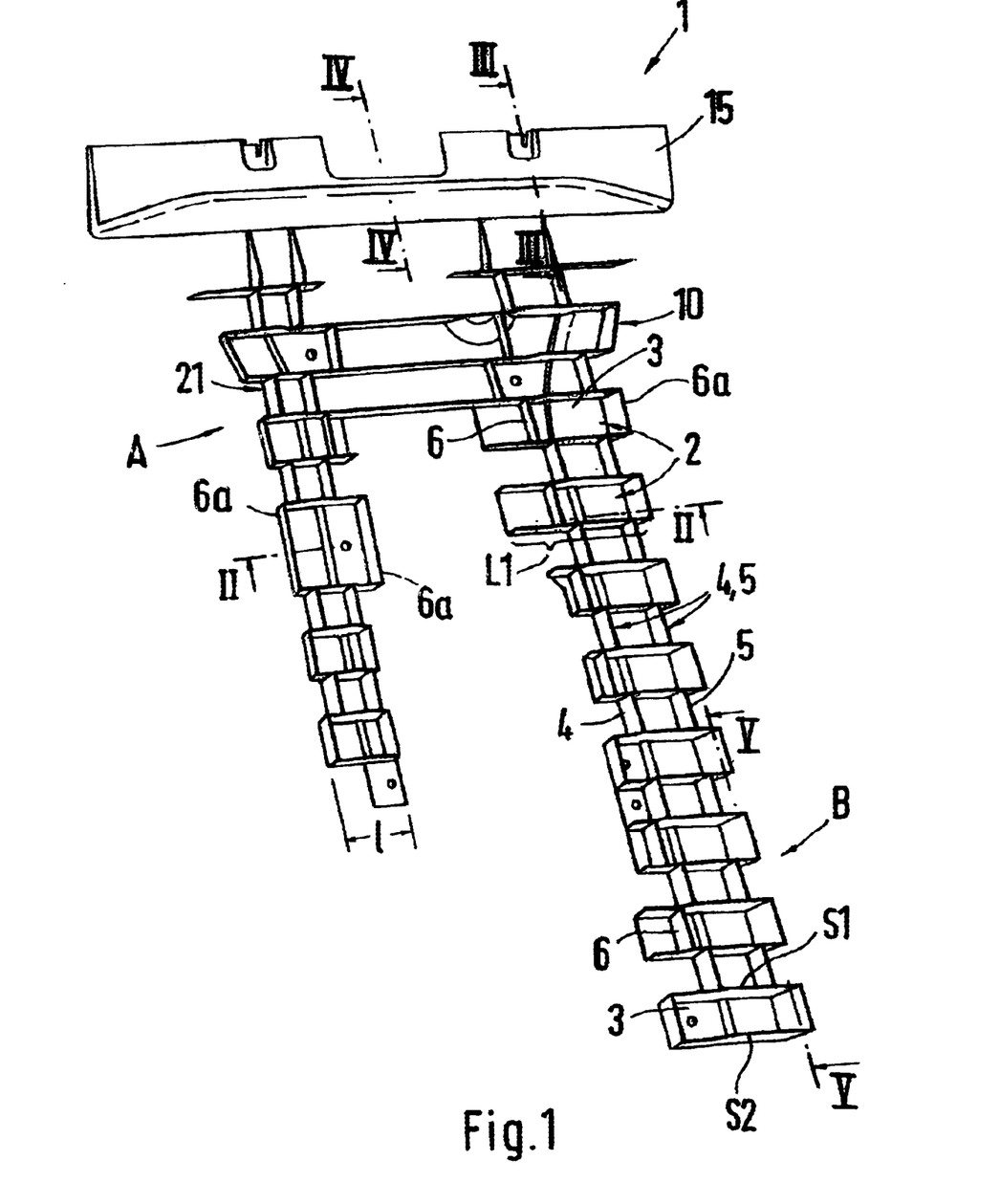
FIG. 1 shows a diagrammatic view of a deformation element with a ramp part for a head airbag.
Figure 2:
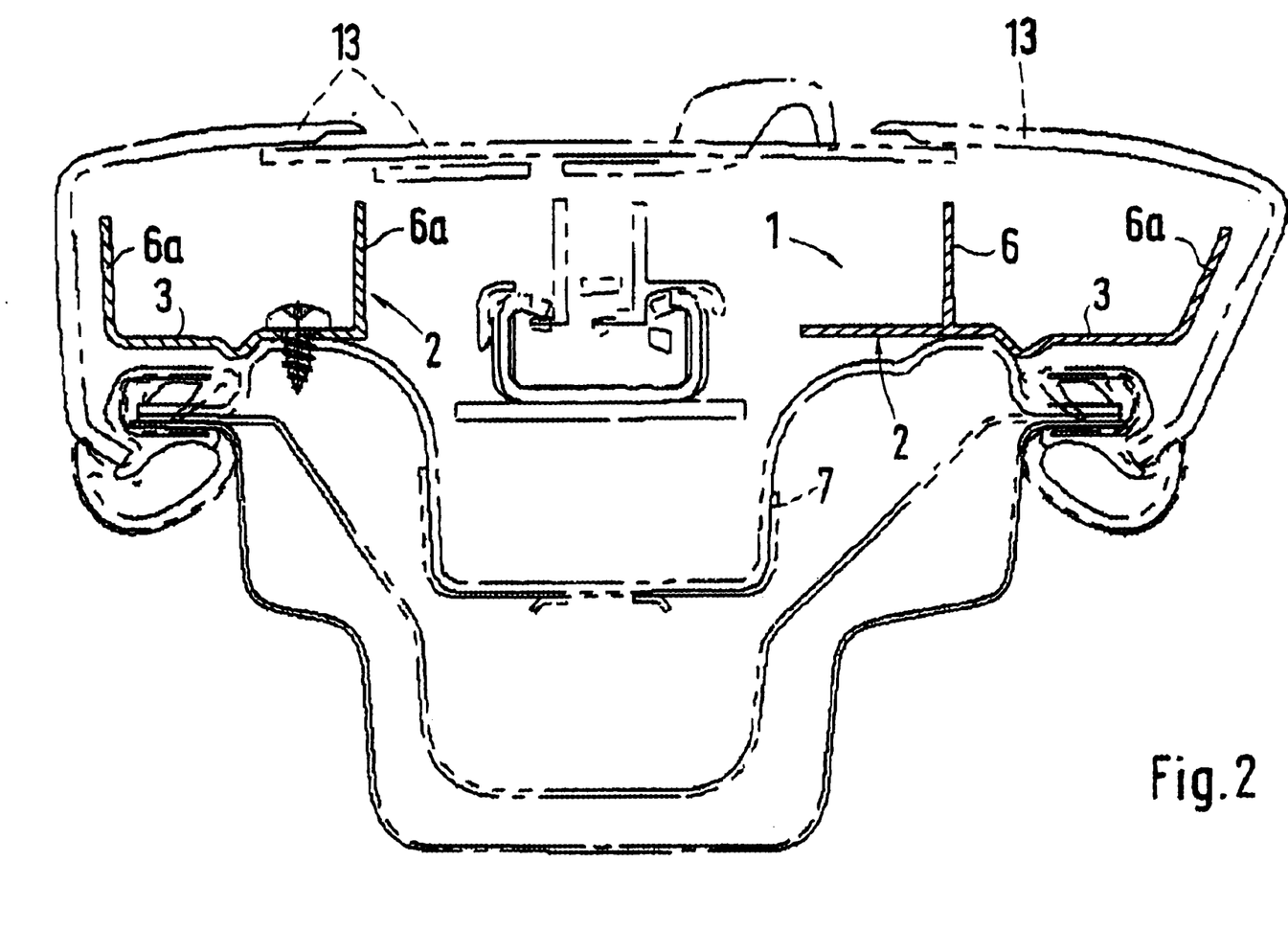
FIG. 2 shows a horizontal section through the deformation element at line II—II of FIG. 1.
Figure 6:
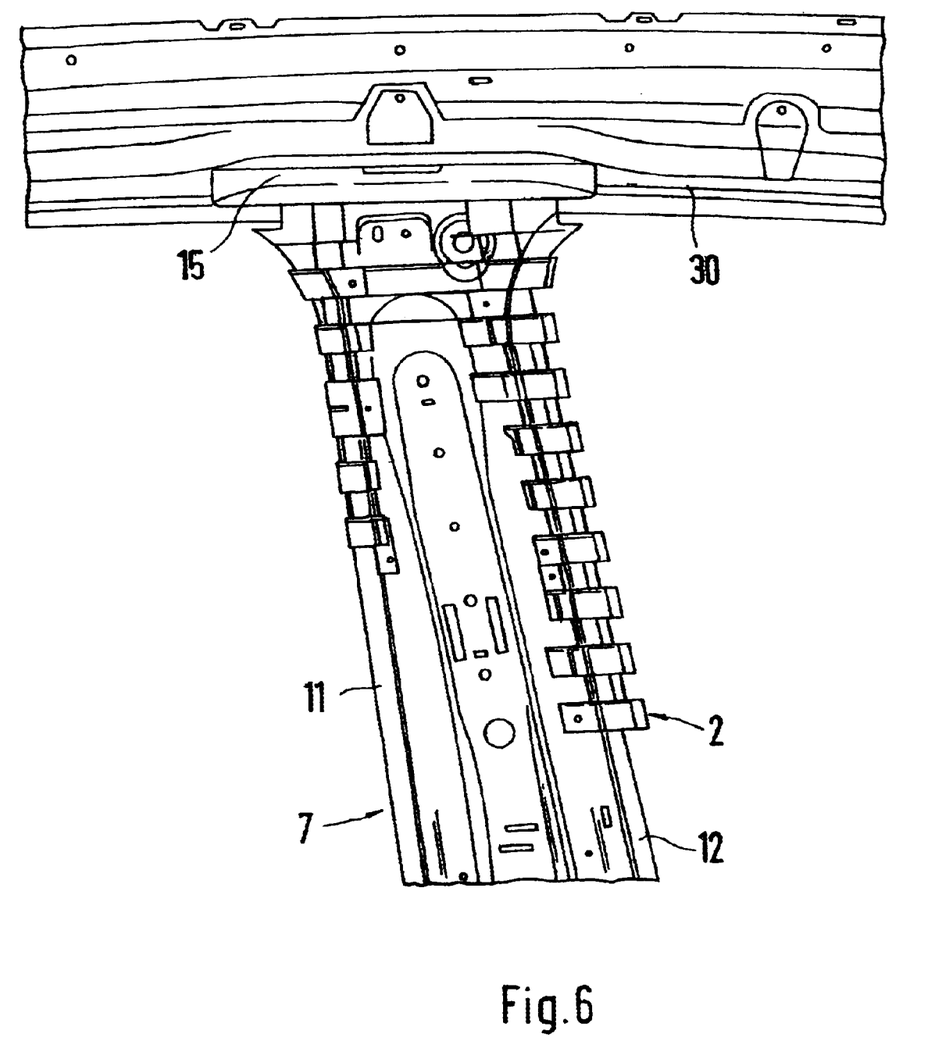
FIG. 6 shows a diagrammatic view of the deformation element—with ramp part—that has been arranged on a pillar.

As shown more closely in FIGS. 1 and 6 with the example of a vehicle pillar 7, in the assembled state the U-beams 2 of the deformation element 1 are arranged transversely to the vehicle pillar 7 on top of each other and roughly in one plane. The U-beams 2 are connected through reinforcement ribs 4, 5, wherein one, two or more connecting ribs can be used. The connecting ribs 4, 5 are arranged adjacent to each other.

As shown in FIGS. 1–6, the deformation element 1 in the vehicle pillar basically comprises two so-called branches A and B, which form a U, wherein the upper end 21 of the deformation element 1 can be a continuous U beam 10. The branches A and B, respectively, are arranged on an extension 11, 12 of a support beam of the pillar 7 and connected with them. The ribs 3 of the beam face the extensions 11, 12 and are supported by them. The legs S1, S2, on the other hand, are arranged at a distance to the interior material 13, as shown more closely in FIG. 2. The legs S1 and S2 can have differing heights and a diverging design, which is dependent upon the assembly requirements. Since the U-beams 2 are fastened to the support beam of the pillar 7, the ribs 3 of the beams 2 are arranged roughly in a joint plane.

As FIG. 1 shows more closely, the U-beams 2 can have differing lengths 1, 11. Furthermore the reinforcement ribs 6 can be arranged in different locations in the beam 2, i.e. they are not arranged in a joint plane. The reinforcement ribs 6a are provided for example at the end of the beam 2 and form an open box-shaped element with the U-beam.

The connecting ribs 4, 5 can also be arranged between the beams 2, for example offset from beam to beam. In the drawings the connecting ribs 4, 5, respectively, are aligned on one line.

Figures 3, 4, 5:
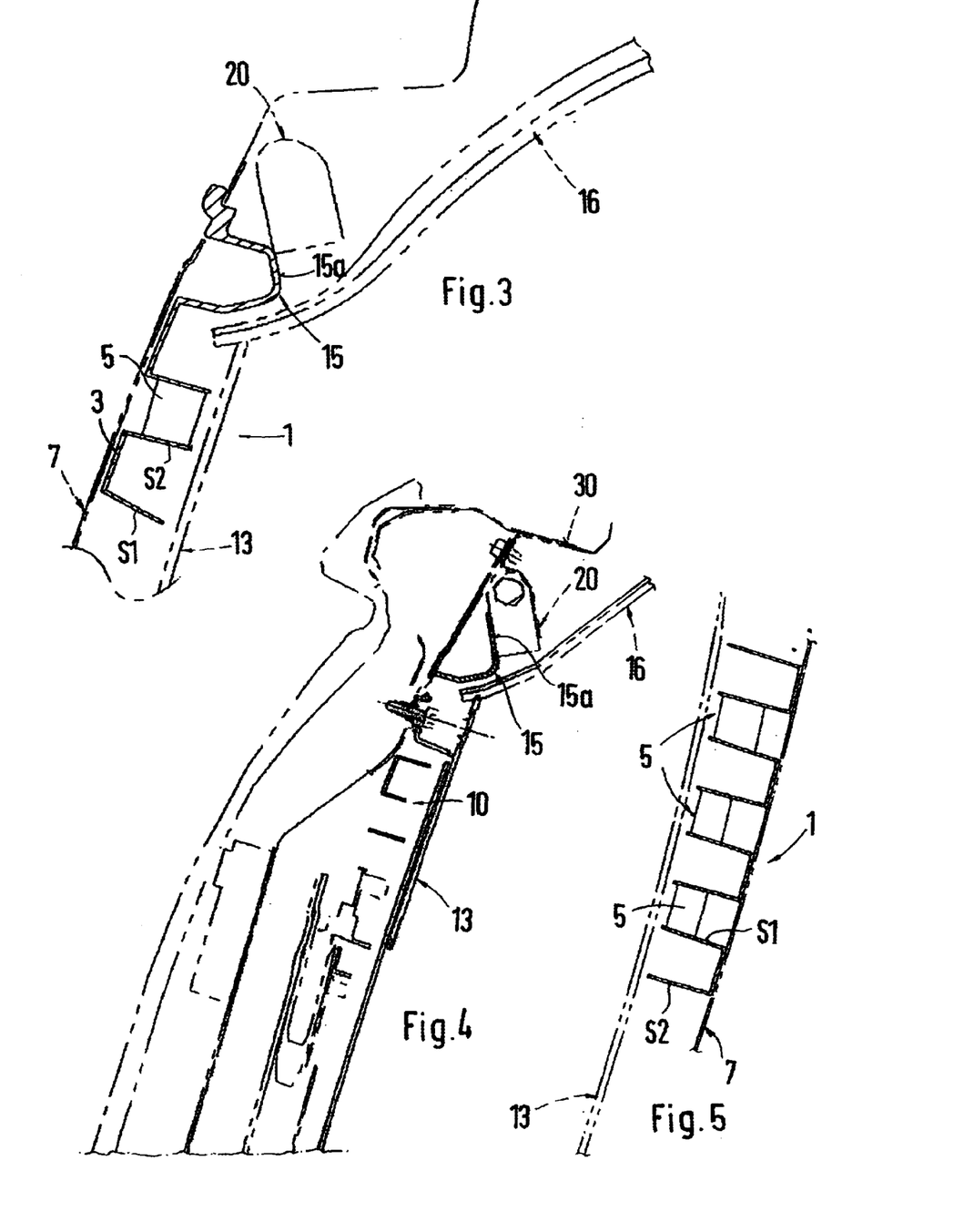
FIG. 3 shows a vertical section through the deformation element at line III—III of FIG. 1.
FIG. 4 shows a vertical section through the deformation element at line IV—IV of FIG. 1.
FIG. 5 shows a vertical section through the deformation element at line V—V of FIG. 1.

Based on another embodiment pursuant to FIG. 3, the upper end of the deformation element 1 can be formed by a ramp part 15 with a tapered surface 15a. The tapered surface 15a of the ramp part 15 establishes a direction for a head airbag 20, which may be arranged in the side roof frame 30, so that the airbag can be guided into an optimized position toward the head of a passenger. This ramp part 1a is an integrated part of the deformation element 1 and at the same time serves to absorb energy during a head impact.

Figure 7:
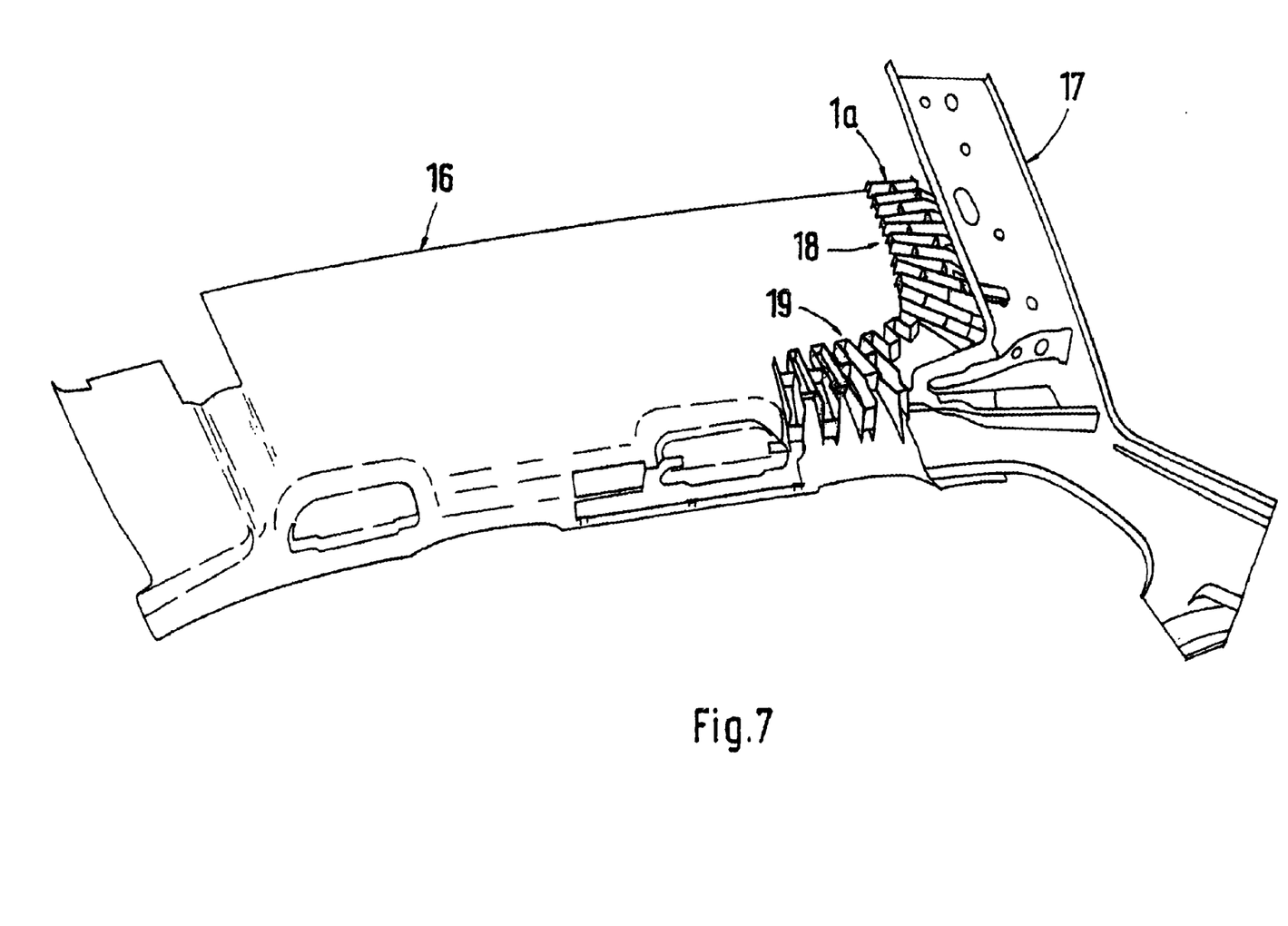
FIG. 7 shows a diagrammatic view of the deformation element between an inside vehicle roof lining and transverse support of the body structure.
Figure 8:
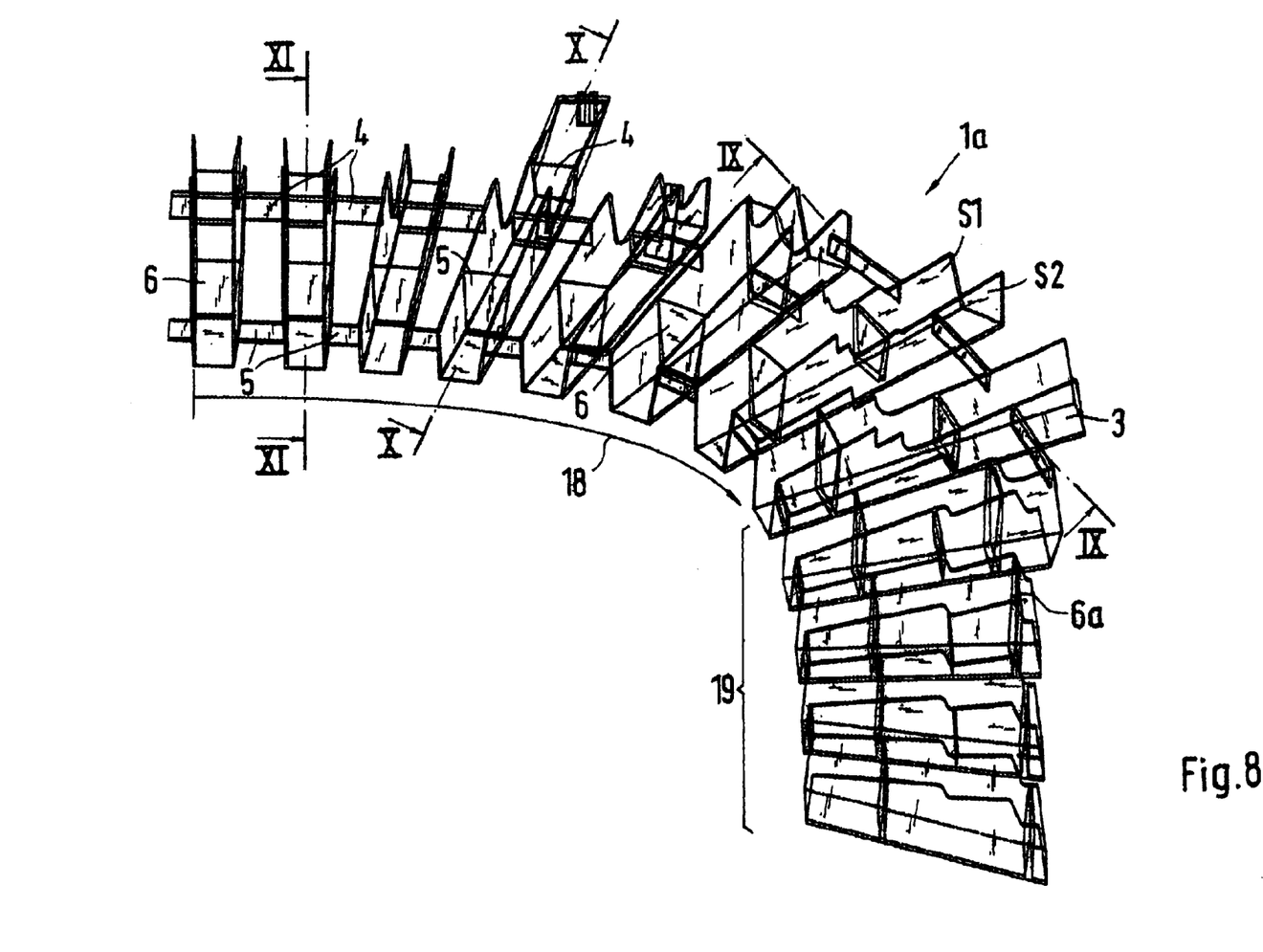
FIG. 8 shows the deformation element pursuant to FIG. 7 in diagrammatic view.
Figure 9:
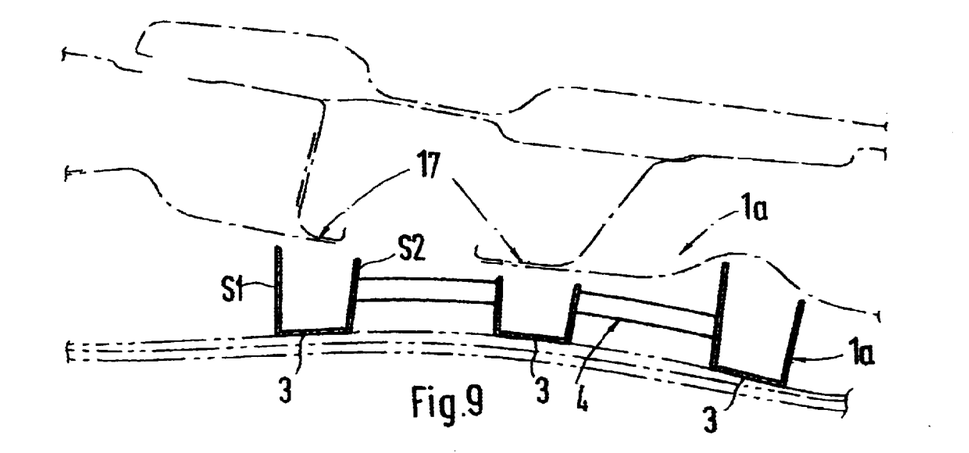
FIG. 9 shows a vertical section through the deformation element at line IX—IX of FIG. 8.
Figure 10:
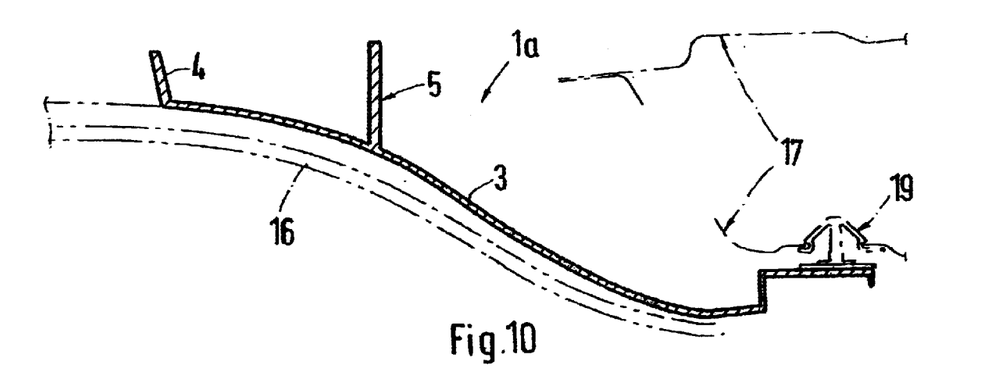
FIG. 10 shows a vertical section through the deformation element at line X—X of FIG. 8.
Figure 11:
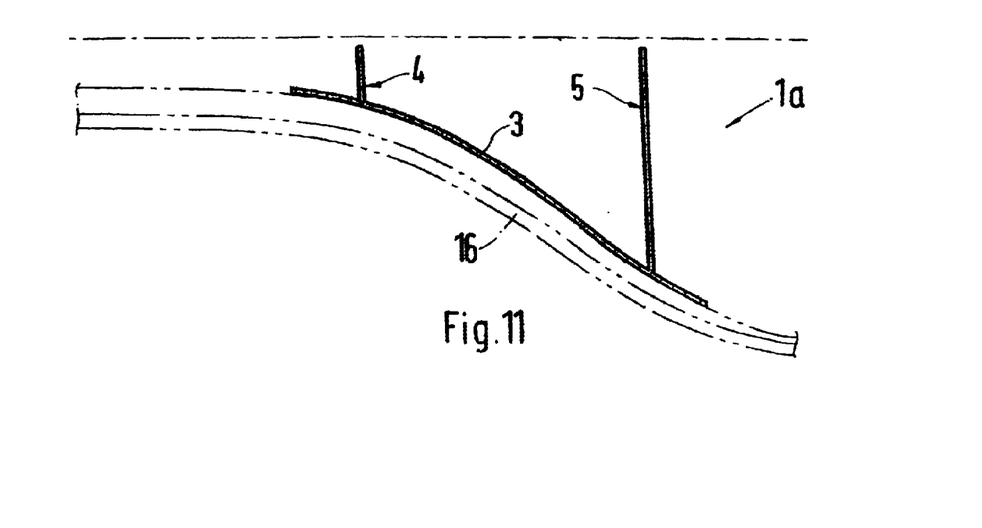
FIG. 11 shows a vertical section through the deformation element at line XI—XI of FIG. 8.

Pursuant to FIGS. 7 and 11, the deformation element 1a is also arranged in the roof area of the vehicle, wherein the body corresponds to the deformation element 1 for the pillar 7. The beams 2 are fastened to the rigid inside roof lining 16 with the ribs 3, wherein the legs S1 and S2 face the support 17 of the vehicle body. The support 17 represents a transverse roof support connected with the vehicle pillars at this end. The deformation element 1a extends crosswise to the vehicle with a first area or section 18 throughout the entire roof width. A second area 19, located at an angle to it, extends in the vehicle's longitudinal direction to form an angled side part. The deformation element 1a is arranged between the rigid inside roof lining 16 and the support 17, wherein the lining 16 can be connected with the support structure through fastening clips 29 or similar devices.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An energy-absorbing deformation element for use in pillars, supports and components for motor vehicles arranged in a body structure between a panel element and an interior material, comprising a latticed element, wherein the deformation element comprises U-beams arranged at a distance to each other, each of the U-beams having a transverse rib and reinforcement ribs arranged transversely between legs of the U-beams, and wherein the beams are connected via connecting ribs to an elongated component that is arranged at least in one plane.

2. The deformation element according to claim 1, wherein the transverse ribs of the U-beams face the panel element when connected with a vehicle pillar, the legs being arranged opposite the interior material.

3. The deformation element according to claim 1, wherein the transverse ribs of the U-beams are connected with a rigid inside roof lining, and wherein the legs face a support.

4. The deformation element according to claim 1, wherein the legs of the U-beams have differing heights in a longitudinal direction of the beams.

5. The deformation element according to claim 2, wherein the legs of the U-beams have differing heights in a longitudinal direction of the beams.

6. The deformation element according to claim 3, wherein the legs of the U-beams have differing heights in a longitudinal direction of the beams.

7. The deformation element according to claim 1,
wherein heights of the legs of the beams are contoured to fit a shape of the panel element, and
wherein outside surfaces of the transverse ribs form a continuous perforated surface.

8. The deformation element according to claim 2,
wherein heights of the legs of the beams are contoured to fit a shape of the panel element, and
wherein outside surfaces of the transverse ribs form a continuous perforated surface.

9. The deformation element according to claim 3,
wherein heights of the legs of the beams are contoured to fit a shape of the panel element, and
wherein outside surfaces of the transverse ribs form a continuous perforated surface.

10. The deformation element according to claim 4,
wherein heights of the legs of the beams are contoured to fit a shape of the panel element, and
wherein outside surfaces of the transverse ribs form a continuous perforated surface.

11. The deformation element according to claim 1, wherein the legs of the U-beam have a diverging design.

12. The deformation element according to claim 2, wherein the legs of the U-beam have a diverging design.

13. The deformation element according to claim 3, wherein the legs of the U-beam have a diverging design.

14. The deformation element according to claim 4, wherein the legs of the U-beam have a diverging design.

15. The deformation element according to claim 7, wherein the legs of the U-beam have a diverging design.

16. The deformation element according to claim 1, wherein adjacent U-beams contain at least two connecting ribs, between which at least one of the reinforcement ribs is located within the beam.

17. The deformation element according to claim 2, wherein adjacent U-beams contain at least two connecting ribs, between which at least one of the reinforcement ribs is located within the beam.

18. The deformation element according to claim 3, wherein adjacent U-beams contain at least two connecting ribs, between which at least one of the reinforcement ribs is located within the beam.

19. The deformation element according to claim 4, wherein adjacent U-beams contain at least two connecting ribs, between which at least one of the reinforcement ribs is located within the beam.

20. The deformation element according to claim 7, wherein adjacent U-beams contain at least two connecting ribs, between which at least one of the reinforcement ribs is located within the beam.

21. The deformation element according to claim 11, wherein adjacent U-beams contain at least two connecting ribs, between which at least one of the reinforcement ribs is located within the beam.

22. The deformation element according to claim 1, wherein the element is connected with a rigid inside roof lining and extends by a first section crosswise to the vehicle as well as with another angled side part in a longitudinal direction of the vehicle.

23. The deformation element according to claim 2, wherein the element is connected with a rigid inside roof lining and extends by a first section crosswise to the vehicle as well as with another angled side part in a longitudinal direction of the vehicle.

24. The deformation element according to claim 3, wherein the element is connected with a rigid inside roof lining and extends by a first section crosswise to the vehicle as well as with another angled side part in a longitudinal direction of the vehicle.

25. The deformation element according to claim 4, wherein the element is connected with a rigid inside roof lining and extends by a first section crosswise to the vehicle as well as with another angled side part in a longitudinal direction of the vehicle.

26. The deformation element according to claim 7, wherein the element is connected with a rigid inside roof lining and extends by a first section crosswise to the vehicle as well as with another angled side part in a longitudinal direction of the vehicle.

27. The deformation element according to claim 11, wherein the element is connected with a rigid inside roof lining and extends by a center first crosswise to the vehicle as well as with another angled side part in a longitudinal direction of the vehicle.

28. The deformation element according to claim 1, wherein the element can be fastened to the vehicle body and the rigid inside roof lining through fastening clips.

29. The deformation element according to claim 2, wherein the element can be fastened to the vehicle body and the rigid inside roof lining through fastening clips.

30. The deformation element according to claim 3, wherein the element can be fastened to the vehicle body and the rigid side roof lining through fastening clips.

31. The deformation element according to claim 4, wherein the element can be fastened to the vehicle body and the rigid inside roof lining through fastening clips.

32. The deformation element according to claim 1,
wherein the element is arranged on a vehicle pillar and is connected via at least one of the transverse ribs, which faces an interior surface of the pillar, and
wherein an interior material of the pillar faces the legs of the beam.

33. The deformation element according to claim 2,
wherein the element is arranged on a vehicle pillar and is connected via at least one of the transverse ribs, which faces an interior surface of the pillar, and
wherein an interior material of the pillar faces the legs of the beam.

34. A The deformation element according to claim 3,
wherein the element is arranged on a vehicle pillar and is connected via at least one of the transverse ribs, which faces an interior surface of the pillar, and
wherein an interior material of the pillar faces the legs of the beam.

35. The deformation element according to claim 1, wherein front edges of the beam legs are arranged at a distance to interior material of a vehicle pillar.

36. The deformation element according to claim 2, wherein front edges of the beam legs are arranged at a distance to interior material of a vehicle pillar.

37. The deformation element according to claim 3, wherein front edges of the beam legs are arranged at a distance to interior material of a vehicle pillar.

38. The deformation element according to claim 1, wherein, in use, the U-beams are arranged transversely to a vehicle pillar and the connecting ribs run longitudinally.

39. The deformation element according to claim 1, wherein on an upper end of the deformation element an oblong, one-piece U-shaped beam is arranged as a lateral deformation element containing a ramp part with a tapered surface for a head airbag arranged in a side roof frame, with the ramp part being arranged at an angle to an interior of the vehicle.

40. The deformation element according to claim 1, wherein the reinforcement ribs are arranged at ends of the U-beams between the legs and thereby an open box-shaped element is formed.

41. The deformation element according to claim 2, wherein the reinforcement ribs are arranged at ends of the U-beams between the legs and thereby an open box-shaped element is formed.

42. The deformation element according to claim 3, wherein the reinforcement ribs are arranged at ends of the U-beams between the legs and thereby an open box-shaped element is formed.

43. The deformation element according to claim 4, wherein the reinforcement ribs are arranged at ends of the U-beams between the legs and thereby an open box-shaped element is formed.

44. The deformation element according to claim 1, wherein, in use, the U-beams are arranged transversely to a vehicle pillar on top of each other roughly in one plane, and the U-beams form two branches located at a distance to each other in a U-shape and are connected with each other on upper free ends at least through one continuous beam element.

45. The deformation element according to claim 2, wherein, in use, the U-beams are arranged transversely to a vehicle pillar on top of each other roughly in one plane, and the U-beams form two branches located at a distance to each other in a U-shape and are connected with each other on upper free ends at least through one continuous beam element.

46. The deformation element according to claim 3, wherein, in use, the U-beams are arranged transversely to a vehicle pillar on top of each other roughly in one plane, and the U-beams form two branches located at a distance to each other in a U-shape and are connected with each other on upper free ends at least through one continuous beam element.

47. The deformation element according to claim 4, wherein, in use, the U-beams are arranged transversely to a vehicle pillar on top of each other roughly in one plane, and the U-beams form two branches located at a distance to each other in a U-shape and are connected with each other on upper free ends at least through one continuous beam element.

48. A deformation element assembly for vehicles, comprising:
    a deformation element arranged in a body structure between a panel element and an interior material, the deformation element having a lattice structure,
    wherein the lattice structure comprises U-shaped beams arranged apart from one another and connected to each other by connecting ribs to form an elongated component which is arranged at least in one plane, the U-shaped beams having a transverse rib and reinforcement ribs arranged between legs of each of the U-shaped beams.

49. The deformation element according to claim 48, wherein the reinforcement ribs are arranged at ends of the U-shaped beams to form an open box-shaped element.

50. The deformation element according to claim 48, wherein the lattice structure is arranged transversely to a vehicle pillar, roughly in one plane.

51. The deformation element according to claim 50, wherein the U-shaped beams form two spaced-apart columns which are connected at one end by an elongated U-shaped beam.

52. A method of making a deformation element assembly for vehicles, comprising:
    forming U-shaped beams by arranging a transverse rib and reinforcement ribs transversely between legs of the U-shaped beams,
    arranging the U-shaped beams at a distance from one another,
    connecting the U-shaped beams via connecting ribs to form an elongated lattice element arranged in at least one plane, and
    arranging the lattice element as a deformation element in a body structure of the vehicle between a panel element and an interior material.

53. The method according to claim 52, wherein the deformation element is arranged on a pillar.

54. The method according to claim 52, wherein the reinforcement ribs are arranged at ends of the U-shaped beams to form an open box-shaped element.

* * * * *